United States Patent
Ando et al.

(10) Patent No.: US 11,843,146 B2
(45) Date of Patent: Dec. 12, 2023

(54) FUEL CELL SYSTEM

(71) Applicants: TOYOTA JIDOSHA KABUSHIKI KAISHA, Toyota (JP); The Regents of the University of California, Oakland, CA (US)

(72) Inventors: Masaki Ando, Gotemba (JP); Toshihiko Yoshida, Fujimi (JP); Adam Z. Weber, Berkeley, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/488,408

(22) Filed: Sep. 29, 2021

(65) Prior Publication Data

US 2022/0102744 A1 Mar. 31, 2022

(30) Foreign Application Priority Data

Sep. 30, 2020 (JP) ................................ 2020-164836

(51) Int. Cl.
*H01M 8/00* (2016.01)
*H01M 8/04828* (2016.01)
*H01M 8/04492* (2016.01)
*H01M 8/04119* (2016.01)

(52) U.S. Cl.
CPC ....... *H01M 8/04835* (2013.01); *H01M 8/045* (2013.01); *H01M 8/04119* (2013.01); *H01M 8/04507* (2013.01)

(58) Field of Classification Search
CPC ......... H01M 8/04835; H01M 8/04119; H01M 8/045; H01M 8/04507
See application file for complete search history.

(56) References Cited

U.S. PATENT DOCUMENTS

2013/0164640 A1* 6/2013 Kasahara .......... H01M 8/04671
429/413

FOREIGN PATENT DOCUMENTS

| JP | 2008027606 A | | 2/2008 |
| JP | 2010123336 A | * | 6/2010 |
| JP | 2015185525 A | | 10/2015 |

OTHER PUBLICATIONS

JP2010123336A Hasegawa espacenet machine translation (Year: 2010).*

* cited by examiner

*Primary Examiner* — Cynthia H Kelly
*Assistant Examiner* — Monique M Wills
(74) *Attorney, Agent, or Firm* — Dickinson Wright, PLLC

(57) ABSTRACT

A fuel cell system comprising: a fuel cell, a fuel gas supplier configured to supply fuel gas to an anode of the fuel cell, an oxidant gas supplier configured to supply oxidant gas to a cathode of the fuel cell, a humidity adjuster configured to adjust a relative humidity of the fuel gas and a relative humidity of the oxidant gas, and a controller, wherein the controller detects the relative humidity of the fuel gas at an anode inlet of the fuel cell, and the controller detects the relative humidity of the oxidant gas at a cathode outlet of the fuel cell, and wherein, based on detection results, the controller controls the humidity adjuster so that the relative humidity of the fuel gas at the anode inlet is higher than the relative humidity of the oxidant gas at the cathode outlet.

3 Claims, 8 Drawing Sheets

FUEL CELL SYSTEM

GOVERNMENT RIGHTS STATEMENT

This invention was made under Cooperative Research and Development Agreement (CRADA) No. FP00004340 between Toyota Motor Corporation, Tokyo Institute of Technology, and the Lawrence Berkeley National Laboratory operated for the United States Department of Energy and with government support under Contract No. DE-AC02-05CH11231 awarded by the U.S. Department of Energy. The government has certain rights in the invention.

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a single unit fuel cell or a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane"). Accordingly, the membrane electrode assembly may be referred to as "membrane electrode gas diffusion layer assembly" (MEGA).

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell configured to be installed and used in a fuel cell vehicle (hereinafter may be simply referred to as "vehicle"). In the fuel cell, the proton conductivity of the electrolyte membrane needs to be ensured during operation. Accordingly, the fuel gas and the oxidant gas are often humidified.

For example, Patent Literature 1 discloses a control means for controlling a humidity control means so that the relative humidity (RH) of the fuel gas in the anode inlet of a fuel cell becomes higher than the relative humidity of the oxidant gas in the cathode inlet of the fuel cell.

Patent Literature 2 discloses that the humidifier of a fuel cell humidifies air supplied to the cathode through the air supply passage such that the air has a relative humidity in the range of 20% or more and 60% or less.

Patent Literature 1: Japanese Patent Application Laid-Open (JP-A) No. 2008-027606

Patent Literature 2: JP-A No. 2015-185525

In Patent Literature 1, the relative humidity of the oxidant gas at the cathode outlet is not defined, and the relative humidity of the oxidant gas at the cathode inlet is defined. Patent Literature 1 mentions that the relative humidity of the oxidant gas at the cathode outlet is controlled to be 100% by generated water. Accordingly, depending on fuel cell operating conditions, both the relative humidity of the fuel gas at the anode inlet and the relative humidity of the oxidant gas at the cathode outlet may be 100% or more. In this case, there is a problem in that desired power output is not obtained from the fuel cell.

SUMMARY

The disclosed embodiments were achieved in light of the above circumstances. An object of the disclosed embodiments is to provide a fuel cell system configured to obtain high power output from a fuel cell by performing control so that the relative humidity of fuel gas at an anode inlet is higher than the relative humidity of oxidant gas at a cathode outlet.

In a first embodiment, there is provided a fuel cell system comprising: a fuel cell, a fuel gas supplier configured to supply fuel gas to an anode of the fuel cell, an oxidant gas supplier configured to supply oxidant gas to a cathode of the fuel cell, a humidity adjuster configured to adjust a relative humidity of the fuel gas and a relative humidity of the oxidant gas, and a controller, wherein the controller detects the relative humidity of the fuel gas at an anode inlet of the fuel cell, and the controller detects the relative humidity of the oxidant gas at a cathode outlet of the fuel cell, and wherein, based on detection results, the controller controls the humidity adjuster so that the relative humidity of the fuel gas at the anode inlet is higher than the relative humidity of the oxidant gas at the cathode outlet.

The relative humidity of the fuel gas at the anode inlet may be 100% or more, and the relative humidity of the oxidant gas at the cathode outlet may be 60% or less.

The relative humidity of the fuel gas at the anode inlet may be 30% or more, and the relative humidity of the oxidant gas at the cathode outlet may be 0% or more and less than 30%.

According to the fuel cell system of the disclosed embodiments, control can be performed so that the relative humidity of the fuel gas at the anode inlet is higher than the relative humidity of the oxidant gas at the cathode outlet, and high power output can be obtained from the fuel cell.

BRIEF DESCRIPTION OF THE DRAWINGS

In the accompanying drawings.

DETAILED DESCRIPTION

Figure 1:
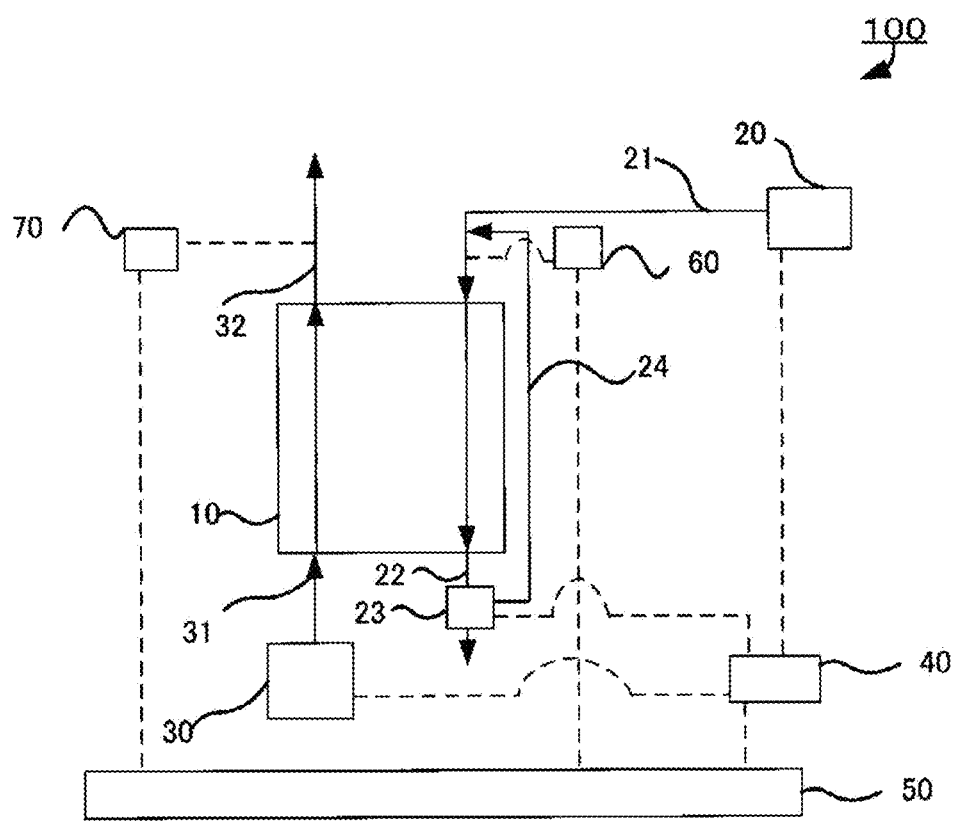
FIG. 1 is a schematic configuration diagram of an example of the fuel cell system according to the disclosed embodiments.

The fuel cell system of the disclosed embodiments is a fuel cell system comprising: a fuel cell, a fuel gas supplier configured to supply fuel gas to an anode of the fuel cell, an oxidant gas supplier configured to supply oxidant gas to a cathode of the fuel cell, a humidity adjuster configured to adjust a relative humidity of the fuel gas and a relative humidity of the oxidant gas, and a controller, wherein the controller detects the relative humidity of the fuel gas at an anode inlet of the fuel cell, and the controller detects the relative humidity of the oxidant gas at a cathode outlet of the fuel cell, and wherein, based on detection results, the controller controls the humidity adjuster so that the relative humidity of the fuel gas at the anode inlet is higher than the relative humidity of the oxidant gas at the cathode outlet.

It was found that the power output (voltage) of the fuel cell is increased by controlling the relative humidity of the fuel gas at the anode inlet to be higher than the relative humidity of the oxidant gas at the cathode outlet. As a result, the technique mentioned in Patent Literature 1 has the following possibility: depending on fuel cell operating conditions, both the relative humidity of the fuel gas at the anode inlet and the relative humidity of the oxidant gas at the cathode outlet reach 100% or more, and high power output is not obtained.

According to the disclosed embodiments, it is possible to perform control so that the relative humidity of the fuel gas at the anode inlet is higher than the relative humidity of the oxidant gas at the cathode outlet, and high power output can be obtained from the fuel cell.

According to the disclosed embodiments, by performing control so that the relative humidity of the fuel gas at the anode inlet is higher than the relative humidity of the oxidant gas at the cathode outlet, the relative humidity of the fuel gas in the whole surface of the anode can be higher than the relative humidity of the oxidant gas in the whole surface of the cathode, and high power output can be obtained from the fuel cell.

The fuel cell system of the disclosed embodiments includes at least the fuel cell, the fuel gas supplier, the oxidant gas supplier, the humidity adjuster and the controller.

In general, the fuel cell system of the disclosed embodiments is installed and used in a fuel cell vehicle that uses a motor as a driving source.

The fuel cell system of the disclosed embodiments may be installed and used in a vehicle that can be run by the power of a secondary cell.

The motor is not particularly limited. It may be a conventionally-known driving motor.

The fuel cell may be a fuel cell composed of only one unit fuel cell, or it may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly.

The membrane electrode assembly includes at least an anode-side gas diffusion layer, an anode catalyst layer, an electrolyte membrane, a cathode catalyst layer and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer".

The catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The cathode-side gas diffusion layer and the anode-side gas diffusion layer are collectively referred to as "gas diffusion layer".

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

As needed, each unit fuel cell may include two separators sandwiching the membrane electrode assembly. One of the two separators is an anode-side separator, and the other is a cathode-side separator. In the disclosed embodiments, the anode-side separator and the cathode-side separator are collectively referred to as "separator".

The separator may have supply and discharge holes for delivering the reaction gas and the refrigerant in the unit fuel cell stacking direction. As the refrigerant, for example, a mixed solution of ethylene glycol and water may be used to prevent freezing at low temperature. The reaction gas is fuel gas or oxidant gas. The fuel gas may be hydrogen or the like. The oxidant gas may be oxygen, air, dry air or the like.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may have a reaction gas flow path on a surface in contact with the gas diffusion layer. Also, on an opposite surface to the surface in contact with the gas diffusion layer, the separator may have a refrigerant flow path for keeping the fuel cell temperature at a constant level.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the anode-side gas diffusion layer, the anode-side separator may have a fuel gas flow path for delivering the fuel gas from the fuel gas supply hole to the fuel gas discharge hole. On the opposite surface to the surface in contact with the anode-side gas diffusion layer, the anode-side separator may have a refrigerant flow path for delivering the refrigerant from the refrigerant supply hole to the refrigerant discharge hole.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the cathode-side gas diffusion layer, the cathode-side separator may have an oxidant gas flow path for delivering the oxidant gas from the oxidant gas supply hole to the oxidant gas discharge hole. On the opposite surface to the surface in contact with the oxidant gas-side gas diffusion layer, the cathode-side separator may have a refrigerant flow path for delivering the refrigerant from the refrigerant supply hole to the refrigerant discharge hole.

The separator may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separator may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The fuel cell system includes the fuel gas supplier. The fuel gas supplier supplies fuel gas to the anode of the fuel cell. The fuel gas supplier may supply fuel gas to the anodes of the fuel cell stack.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel gas supplier is electrically connected to the controller or the humidity adjuster. The fuel gas supplier is driven by a control signal from the controller or the humidity adjuster. At least one selected from the group consisting of the flow rate and pressure of the fuel gas supplied from the fuel gas supplier to the anode, may be controlled by the controller or the humidity adjuster.

The fuel cell system may include a fuel gas supply flow path.

The fuel gas supply flow path connects the fuel gas supplier and the anode inlet of the fuel cell. The fuel gas supply flow path enables the supply of fuel gas from the fuel gas supplier to the anode of the fuel cell. The fuel gas supply flow path enables the supply of fuel gas from the fuel gas supplier to the anodes of the fuel cell stack.

The fuel cell system may include a fuel off-gas discharge flow path.

The fuel off-gas discharge flow path is connected to the anode outlet of the fuel cell. The fuel off-gas discharge flow path recovers fuel off-gas which is fuel gas discharged from the anode of the fuel cell. The fuel off-gas discharge flow path may recover fuel off-gas discharged from the anodes of the fuel cell stack.

The fuel off-gas contains the following, for example: fuel gas which passed through the anode while remaining unreacted; water generated at the cathode and delivered to the anode; corroded substances generated in the catalyst layer, the electrolyte membrane and so on; and oxidant gas which may be supplied to the anode during a purge.

The fuel off-gas discharge flow path may include a fuel off-gas discharge valve.

The fuel off-gas discharge valve enables the discharge of fuel off-gas to the outside (the outside of the system). The outside may be the outside of the fuel cell system, or it may be the outside of the vehicle.

The fuel off-gas discharge valve may be electrically connected to the controller or the humidity adjuster, and the flow amount of the fuel off-gas discharged to the outside may be controlled by controlling the opening and closing of the fuel off-gas discharge valve by the controller or the humidity adjuster. By controlling the opening degree of the fuel off-gas discharge valve, the pressure of the fuel gas supplied to the anode (anode pressure) may be controlled.

The fuel cell system may include a circulation flow path.

The circulation flow path branches from the fuel off-gas discharge flow path and connects to the fuel gas supply flow path. The circulation flow path enables that the recovered fuel off-gas is returned as circulation gas to the anode. Also, the circulation flow path enables the supply of water contained in the recovered fuel off-gas to the anode. The circulation flow path may join the fuel gas supply flow path at the junction of the fuel gas supply flow path and the circulation flow path.

As needed, the circulation flow path of the fuel cell system may be provided with an ejector, a circulation pump for controlling the flow rate of the circulation gas (such as a hydrogen pump), etc.

The circulation pump may be electrically connected to the controller or the humidity adjuster, and the flow rate of the circulation gas may be controlled by controlling the turning on/off, rotational frequency, etc., of the circulation pump by the controller or the humidity adjuster.

The ejector may be disposed at the junction of the fuel gas supply flow path and the circulation flow path, for example. The ejector supplies mixed gas containing the fuel gas and the circulation gas to the anode of the fuel cell. The ejector may supply the mixed gas to the anodes of the fuel cell stack. As the ejector, a conventionally-known ejector may be used.

The fuel cell system includes the oxidant gas supplier.

The oxidant gas supplier supplies oxidant gas to the cathode of the fuel cell. The oxidant gas supplier may supply oxidant gas to the cathodes of the fuel cell stack.

The oxidant gas is oxygen-containing gas. It may be air, dry air, pure oxygen or the like.

As the oxidant gas supplier, for example, an air compressor may be used.

The oxidant gas supplier is electrically connected to the controller or the humidity adjuster. The oxidant gas supplier is driven by a control signal from the controller or the humidity adjuster. At least one selected from the group consisting of the flow rate and pressure of the oxidant gas supplied from the oxidant gas supplier to the cathode, may be controlled by the controller or the humidity adjuster.

The fuel cell system may include an oxidant gas supply flow path.

The oxidant gas supply flow path connects the oxidant gas supplier and the cathode inlet of the fuel cell. The oxidant gas supply flow path enables the supply of oxidant gas from the oxidant gas supplier to the cathode of the fuel cell. The oxidant gas supply flow path may enable the supply of oxidant gas from the oxidant gas supplier to the cathodes of the fuel cell stack.

The fuel cell system may include an oxidant off-gas discharge flow path.

The oxidant off-gas discharge flow path is connected to the cathode outlet of the fuel cell. The oxidant off-gas discharge flow path enables the discharge of oxidant off-gas to the outside, which is oxidant gas discharged from the cathode of the fuel cell. The oxidant off-gas discharge flow path may enable the discharge of oxidant off-gas to the outside, which is oxidant gas discharged from the cathodes of the fuel cell stack.

The oxidant off-gas discharge flow path may be provided with an oxidant gas pressure control valve.

The oxidant gas pressure control valve is electrically connected to the controller or the humidity adjuster. By opening the oxidant gas pressure control valve by the controller or the humidity adjuster, oxidant off-gas, which is reacted oxidant gas, is discharged from the oxidant off-gas discharge flow path to the outside. By controlling the opening degree of the oxidant gas pressure control valve, the pressure of the oxidant gas supplied to the cathode (cathode pressure) may be controlled.

The fuel gas supply flow path and the oxidant gas supply flow path may be connected via a joining flow path. The joining flow path may be provided with a purge valve.

The purge valve may be electrically connected to the controller or the humidity adjuster. By opening the purge valve by the controller or the humidity adjuster, the oxidant gas in the oxidant gas supplier may be allowed to flow into the fuel gas supply flow path as purge gas.

The purge gas is used for purging. It may be fuel gas, oxidant gas or mixed reaction gas containing them.

The fuel cell system may include a refrigerant supplier and a refrigerant circulation flow path as the cooling system of the fuel cell.

The refrigerant circulation flow path communicates between the refrigerant supply hole and refrigerant discharge hole installed in the fuel cell, and it enables that the refrigerant supplied from the refrigerant supplier is circulated in and out of the fuel cell.

The refrigerant supplier is electrically connected to the controller or the humidity adjuster. The refrigerant supplier is driven by a control signal from the controller or the humidity adjuster. The flow rate of the refrigerant supplied from the refrigerant supplier to the fuel cell, is controlled by the controller or the humidity adjuster. The fuel cell temperature may be controlled thereby.

As the refrigerant supplier, examples include, but are not limited to, a cooling water pump.

The refrigerant circulation flow path may be provided with a radiator for heat dissipation from cooling water.

As the cooling water (refrigerant), for example, a mixed solution of ethylene glycol and water may be used to prevent freezing at low temperature.

The fuel cell system may include the secondary cell.

The secondary cell (battery) needs to be a chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier, etc. The secondary cell may be chargeable by a power source outside the vehicle, such as a household power source. The secondary cell may be charged by the output power of the fuel cell. The charge and discharge of the secondary cell may be controlled by the controller.

The fuel cell system includes the controller.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an electronic control unit (ECU).

The controller may be electrically connected to the ignition switch that may be installed in the vehicle. The controller may be operable by an external power source even if the ignition switch is turned off.

The controller detects the relative humidity of the fuel gas at the anode inlet of the fuel cell, and the controller detects the relative humidity of the oxidant gas at the cathode outlet of the fuel cell.

The fuel cell system may include an anode humidity sensor near the anode inlet of the fuel cell. The anode humidity sensor may be disposed at any position on the fuel gas supply flow path. When a humidity exchanger, a water tank, a circulation flow path junction, etc., are disposed on the fuel gas supply flow path, the anode humidity sensor may be disposed at a lower position (closer to the fuel cell) than them. The anode humidity sensor measures the relative humidity of the fuel gas at the anode inlet of the fuel cell. The controller may be electrically connected to the anode humidity sensor. Then, the anode humidity sensor may transmit a measurement result to the controller, and the controller may detect the relative humidity of the fuel gas at the anode inlet measured by the anode humidity sensor. The detected relative humidity of the fuel gas at the anode inlet of the fuel cell may be deemed as the relative humidity of the fuel gas in the whole surface of the anode of the fuel cell.

The fuel cell system may include a cathode humidity sensor near the cathode outlet of the fuel cell. The cathode humidity sensor may be disposed at any position on the oxidant off-gas discharge flow path. When a humidity exchanger, a cathode gas-liquid separator, etc., are disposed on the oxidant off-gas discharge flow path, the cathode humidity sensor may be disposed at an upper position (closer to the fuel cell) than them. The cathode humidity sensor measures the relative humidity of the oxidant gas at the cathode outlet of the fuel cell. The controller may be electrically connected to the cathode humidity sensor. Then, the cathode humidity sensor may transmit a measurement result to the controller, and the controller may detect the relative humidity of the oxidant gas at the cathode outlet measured by the cathode humidity sensor. The detected relative humidity of the oxidant gas at the cathode outlet of the fuel cell may be deemed as the relative humidity of the oxidant gas in the whole surface of the cathode of the fuel cell.

In the disclosed embodiments, the anode humidity sensor and the cathode humidity sensor are collectively referred to as "humidity sensor". The humidity sensor is composed of a dew point meter, for example.

The fuel cell system may include a temperature sensor and a current sensor.

The temperature sensor measures the temperature of the fuel cell. The controller may be electrically connected to the temperature sensor. The temperature sensor transmits a measurement result to the controller, and the controller may detect the temperature of the fuel cell measured by the temperature sensor.

The current sensor measures a current flowing in the fuel cell. The controller may be electrically connected to the current sensor. The current sensor transmits a measurement result to the controller, and the controller may detect the current of the fuel cell measured by the current sensor.

The controller detects the current flowing in the fuel cell, the temperature of the fuel cell, at least one selected from the group consisting of the flow rate and pressure of the fuel gas supplied from the fuel gas supplier to the anode, and at least one selected from the group consisting of the flow rate and pressure of the oxidant gas supplied from the oxidant gas supplier to the cathode. From the detection results, the controller derives the generated power distribution and humidity distribution in the whole surface of the anode, and it detects the generated power distribution and humidity distribution in the whole surface of the cathode. From the derived results, the controller may detect the relative humidity of the fuel gas in the whole surface of the anode of the fuel cell, and it may detect the relative humidity of the oxidant gas in the whole surface of the cathode of the fuel cell. Then, the detected relative humidity of the fuel gas in the whole surface of the anode of the fuel cell, may be deemed as the relative humidity of the fuel gas at the anode inlet of the fuel cell. Also, the detected relative humidity of the oxidant gas in the whole surface of the cathode of the fuel cell, may be deemed as the relative humidity of the oxidant gas at the cathode outlet of the fuel cell.

Based on the detection results, the controller controls the humidity adjuster so that the relative humidity of the fuel gas at the anode inlet is higher than the relative humidity of the oxidant gas at the cathode outlet.

The relative humidity of the fuel gas at the anode inlet may be 30% or more. In this case, the relative humidity of the oxidant gas at the cathode outlet may be 0% or more. From the viewpoint of reducing the resistance of the fuel cell, the relative humidity of the oxidant gas at the cathode outlet may be 10% or more, or it may be 20% or more. From the viewpoint of increasing the voltage of the fuel cell, the relative humidity of the oxidant gas at the cathode outlet may be less than 30%.

The relative humidity of the fuel gas at the anode inlet may be 100% or more. In the fuel cell, accordingly, the removal of water from the oxidant gas by the fuel gas can be suppressed, and the relative humidity of the oxidant gas at the cathode outlet can be easily controlled, therefore. The relative humidity of the oxidant gas at the cathode outlet may be lower than the relative humidity of the fuel gas at the anode inlet. The relative humidity of the oxidant gas at the cathode outlet may be 0% or more. From the viewpoint of reducing the resistance of the fuel cell, the relative humidity of the oxidant gas at the cathode outlet may be 10% or more, may be 20% or more, may be 30% or more, or may be 40% or more. From the viewpoint of increasing the voltage of the fuel cell, the relative humidity of the oxidant gas at the cathode outlet may be 60% or less.

The fuel cell system includes the humidity adjuster.

The humidity adjuster adjusts the relative humidity of the fuel gas and the relative humidity of the oxidant gas.

The humidity adjuster may be feedback-controlled by the controller so that the relative humidity of the fuel gas at the anode inlet is higher than the relative humidity of the oxidant gas at the cathode outlet.

The humidity adjuster may also function as the controller.

When the humidity adjuster also functions as the controller, the humidity adjuster may be electrically connected to the refrigerant supplier, the fuel off-gas discharge valve, the oxidant gas pressure control valve, the purge valve, the fuel gas supplier, the oxidant gas supplier, the refrigerant supplier, the cathode gas-liquid separator, an anode gas-liquid separator, the humidity exchanger, the water tank and so on through an input-output interface.

The humidity adjuster may control at least one selected from the group consisting of the flow rate and pressure of the fuel gas supplied to the anode of the fuel cell, by controlling the fuel gas supplier and so on.

The humidity adjuster may control at least one selected from the group consisting of the flow rate and pressure of the oxidant gas supplied to the cathode of the fuel cell, by controlling the oxidant gas supplier and so on.

The humidity adjuster may control the temperature of the fuel cell by controlling the refrigerant supplier.

The humidity adjuster may include the water tank, the cathode gas-liquid separator, the anode gas-liquid separator, the humidity exchanger, etc.

The water tank supplies water to the anode. The water tank is electrically connected to the controller or the humidity adjuster. The water tank is driven by a control signal from the controller or the humidity adjuster. The amount of water supplied to the anode may be controlled by controlling the water tank by the controller or the humidity adjuster.

The cathode gas-liquid separator is connected to the oxidant off-gas discharge flow path. The cathode gas-liquid separator separates the generated water and oxidant gas contained in the oxidant off-gas that is the oxidant gas discharged from the cathode outlet. The cathode gas-liquid separator recovers the generated water and supplies the recovered generated water to the anode. The cathode gas-liquid separator may be electrically connected to the controller or the humidity adjuster. The opening and closing of the outlet valve of the cathode gas-liquid separator and the opening degree thereof may be controlled by controlling the cathode gas-liquid separator by the controller or the humidity adjuster. The amount of water supplied to the anode may be controlled thereby.

The anode gas-liquid separator is disposed at the branch point of the fuel off-gas discharge flow path to the circulation flow path. The anode gas-liquid separator separates the water and fuel gas contained in the fuel off-gas that is the fuel gas discharged from the anode outlet. The anode gas-liquid separator recovers the water and supplies the recovered water to the anode. The anode gas-liquid separator may be electrically connected to the controller or the humidity adjuster. The opening and closing of the outlet valve of the anode gas-liquid separator and the opening degree thereof may be controlled by controlling the anode gas-liquid separator by the controller or the humidity adjuster. The amount of water supplied to the anode may be controlled thereby.

The humidity exchanger is connected to the fuel gas supply flow path, and it is connected to any one of the oxidant gas supply flow path and the oxidant off-gas discharge flow path. When the humidity exchanger is connected to the fuel gas supply flow path and the oxidant gas supply flow path, it recovers the water contained in the oxidant gas supplied to the cathode, and it supplies the recovered water to the fuel gas supply flow path. When the humidity exchanger is connected to the fuel gas supply flow path and the oxidant off-gas discharge flow path, it recovers the generated water contained in the oxidant off-gas that is the oxidant gas discharged from the cathode outlet, and it supplies the recovered generated water to the fuel gas supply flow path. The humidity exchanger may be electrically connected to the controller or the humidity adjuster. The amount of water supplied to the anode may be controlled by controlling the humidity exchanger by the controller or the humidity adjuster. The humidity exchanger may be a humidifier, for example.

Anode-Side Control

The humidity adjuster may adjust the relative humidity of the fuel gas at the anode inlet.

The relative humidity of the fuel gas at the anode inlet may be adjusted by, for example, injecting water to the fuel gas supplied to the anode.

The relative humidity of the fuel gas may be adjusted by the following method. The controller monitors the relative humidity of the fuel gas at the anode inlet by the anode humidity sensor. Based on a measurement result, the controller controls the humidity adjuster to supply water, which is in an amount such that the relative humidity of the fuel gas at the anode inlet can be higher than the relative humidity of the oxidant gas at the cathode outlet, from the water tank to the anode, thereby adjusting the relative humidity of the fuel gas at the anode inlet.

The relative humidity of the fuel gas may be adjusted by the following method. The controller monitors the relative humidity of the fuel gas at the anode inlet by the anode humidity sensor. Based on a measurement result, the controller controls the humidity adjuster to supply generated water, which is in an amount such that the relative humidity of the fuel gas at the anode inlet can be higher than the relative humidity of the oxidant gas at the cathode outlet, from the cathode gas-liquid separator to the anode, thereby adjusting the relative humidity of the fuel gas at the anode inlet. In this case, the amount of injected water may be controlled depending on conditions such as the flow rate of the oxidant gas supplied to the cathode.

The relative humidity of the fuel gas may be adjusted by the following method. The controller monitors the relative humidity of the fuel gas at the anode inlet by the anode humidity sensor. Based on a measurement result, the controller controls the humidity adjuster to supply water, which is in an amount such that the relative humidity of the fuel gas at the anode inlet can be higher than the relative humidity of the oxidant gas at the cathode outlet, from the anode gas-liquid separator to the anode, thereby adjusting the relative humidity of the fuel gas at the anode inlet. In this case, the amount of injected water may be controlled depending on conditions such as the flow rate of the fuel gas supplied to the anode.

The relative humidity of the fuel gas may be adjusted by the following method. The controller monitors the relative humidity of the fuel gas at the anode inlet by the anode humidity sensor. Based on a measurement result, the controller controls the humidity adjuster to supply water, which is in an amount such that the relative humidity of the fuel gas at the anode inlet can be higher than the relative humidity of the oxidant gas at the cathode outlet, from the humidity exchanger to the anode, thereby adjusting the relative humidity of the fuel gas at the anode inlet.

The relative humidity of the fuel gas may be adjusted by the following method. With monitoring the fuel cell temperature by the temperature sensor, the controller detects the fuel cell temperature and at least one selected from the group consisting of the flow rate and pressure of the fuel gas supplied to the anode. Based on the detection results, the controller calculates the amount of liquid water needed to make the relative humidity of the fuel gas at the anode inlet higher than the relative humidity of the oxidant gas at the cathode outlet. Based on the calculation result, the controller controls the humidity adjuster to control the water tank, the outlet valve of the cathode gas-liquid separator, the outlet valve of the anode gas-liquid separator, or the humidity exchanger. The calculated amount of water is supplied to the anode, thereby adjusting the relative humidity of the fuel gas at the anode inlet.

The relative humidity of the fuel gas may be adjusted by the following method. With monitoring the fuel cell temperature by the temperature sensor, the controller detects the fuel cell temperature and at least one selected from the group consisting of the flow rate and pressure of the fuel gas supplied to the anode. Based on the detection results, the controller calculates the amount of liquid water needed to make the relative humidity of the fuel gas at the anode inlet higher than the relative humidity of the oxidant gas at the cathode outlet. Based on the calculation result, the controller controls the humidity adjuster to control at least one selected from the group consisting of the flow rate and pressure of the fuel gas supplied from the fuel gas supplier to the anode. The calculated amount of water is supplied to the anode, thereby adjusting the relative humidity of the fuel gas. In this case, the humidity adjuster is electrically connected to the fuel gas supplier to control at least one selected from the group consisting of the flow rate and pressure of the fuel gas supplied from the fuel gas supplier to the anode.

During the operation of the fuel cell, the fuel gas (hydrogen) is constantly consumed. Accordingly, by any one of the above-mentioned adjusting methods, the relative humidity of the fuel gas in the whole surface of the anode can be higher than the relative humidity of the oxidant gas at the cathode outlet. Accordingly, the relative humidity of the fuel gas at the anode inlet may be deemed as the relative humidity of the fuel gas in the whole surface of the anode.

Cathode-Side Control

The humidity adjuster may adjust the relative humidity of the oxidant gas at the cathode outlet.

The humidity adjuster may adjust the relative humidity of the oxidant gas at the cathode outlet by controlling at least one selected from the group consisting of the flow rate and pressure of the oxidant gas supplied from the oxidant gas supplier to the cathode. In this case, the humidity adjuster is electrically connected to the oxidant gas supplier to control at least one selected from the group consisting of the flow rate and pressure of the oxidant gas supplied from the oxidant gas supplier to the cathode.

The humidity adjuster may adjust the relative humidity of the oxidant gas at the cathode outlet by controlling the temperature of the fuel cell. The temperature of the fuel cell may be controlled by controlling the flow rate of the refrigerant circulating in and out of the fuel cell. In this case, the humidity adjuster is electrically connected to the refrigerant supplier to control the flow rate of the refrigerant supplied from the refrigerant supplier to the fuel cell.

In the cathode, the oxidant gas is consumed to generate water (generated water). In the cathode, accordingly, the relative humidity of the oxidant gas at the cathode outlet is generally the maximum relative humidity. Accordingly, the relative humidity of the oxidant gas at the cathode outlet may be deemed as the relative humidity of the oxidant gas in the whole surface of the cathode.

The relative humidity of the oxidant gas may be adjusted by the following method. The controller monitors the relative humidity of the oxidant gas at the cathode outlet by the cathode humidity sensor. Based on a measured relative humidity, the controller controls the humidity adjuster to control at least one selected from the group consisting of the flow rate and pressure of the oxidant gas supplied from the oxidant gas supplier to the cathode, thereby adjusting the relative humidity of the oxidant gas at the cathode outlet.

The relative humidity of the oxidant gas may be adjusted by the following method. The controller monitors the relative humidity of the oxidant gas at the cathode outlet by the cathode humidity sensor. Based on a measured relative humidity, the controller controls the humidity adjuster to control the temperature of the fuel cell, thereby adjusting the relative humidity of the oxidant gas at the cathode outlet.

When the oxidant gas and the fuel gas flow in opposite directions, in the middle of passing through the cathode of the fuel cell, the water of the oxidant gas passes through the electrolyte membrane and transfers to the anode. Accordingly, there is a possibility that the relative humidity of the oxidant gas at the cathode outlet is not the maximum relative humidity. In this case, the controller detects the current flowing in the fuel cell, the temperature of the fuel cell, the flow rate and pressure of the fuel gas supplied to the anode, and the flow rate and pressure of the oxidant gas supplied to the cathode. From the detection results, the controller calculates the generated power distribution and humidity distribution in the whole surface of the anode and the generated power distribution and humidity distribution in the whole surface of the cathode. From the calculation results, the controller may estimate the relative humidity of the oxidant gas in the whole surface of the cathode and the relative humidity of the fuel gas in the whole surface of the anode. The relative humidity of the oxidant gas in the whole surface of the cathode may be deemed as the relative humidity of the oxidant gas at the cathode outlet. Based on the estimation results, using the humidity adjuster, the controller may control the fuel cell temperature or at least one selected from the group consisting of the flow rate and pressure of the oxidant gas supplied to the cathode so that the relative humidity of the oxidant gas in the whole surface of the cathode is less than the relative humidity of the fuel gas in the whole surface of the anode.

Also, the relative humidity of the oxidant gas in the whole surface of the cathode and the relative humidity of the fuel gas in the whole surface of the anode may be estimated as follows. First, the current flowing in the fuel cell, the temperature of the fuel cell, the flow rate and pressure of the fuel gas supplied to the anode, and the flow rate and pressure of the oxidant gas supplied to the cathode, all of which are simulated in advance, and a data group showing the relationship between the generated power distribution and humidity distribution in the whole surface of the anode and the generated power distribution and humidity distribution in the whole surface of the cathode, are prepared and incorporated in the controller. Then, the controller compares the current flowing in the fuel cell, the temperature of the fuel cell, the flow rate and pressure of the fuel gas supplied to the anode, and the flow rate and pressure of the oxidant gas supplied to the cathode with the data group, thereby deriving the generated power distribution and humidity distribution in the whole surface of the anode and the generated power distribution and humidity distribution in the whole surface of the cathode. Then, the relative humidity of the oxidant gas in the whole surface of the cathode and the relative humidity of the fuel gas in the whole surface of the anode are estimated. The relative humidity of the oxidant gas in the whole surface of the cathode may be deemed as the relative humidity of the oxidant gas at the cathode outlet. Then, using the humidity adjuster, the controller may control the fuel cell temperature or at least one selected from the group consisting of the flow rate and pressure of the oxidant gas supplied to the cathode so that the relative humidity of the oxidant gas in the whole surface of the cathode is less than the relative humidity of the fuel gas in the whole surface of the anode.

In general, the relative humidity of the oxidant gas supplied to the cathode is about 60% at room temperature, when the oxidant gas is not passed through a humidifier or the like and the fuel cell temperature is in a range of from 50° C. to 80° C. Accordingly, it is relatively easy to control the relative humidity of the oxidant gas at the cathode outlet to be lower than the relative humidity of the fuel gas at the anode inlet, by use of the flow rate, pressure and so on of the oxidant gas supplied to the cathode. Accordingly, the relative humidity of the oxidant gas at the cathode outlet may be adjusted by feedback control of at least one selected from the group consisting of the fuel cell temperature and the flow rate and pressure of the oxidant gas supplied to the cathode.

FIG. 1 is a schematic configuration diagram of an example of the fuel cell system according to the disclosed embodiments.

A fuel cell system 100 shown in FIG. 1 includes a fuel cell 10, a fuel gas supplier 20, a fuel gas supply flow path 21, a fuel off-gas discharge flow path 22, an anode gas-liquid separator 23, a circulation flow path 24, an oxidant gas supplier 30, an oxidant gas supply flow path 31, an oxidant off-gas discharge flow path 32, a humidity adjuster 40, a controller 50, an anode humidity sensor 60 and a cathode humidity sensor 70.

The anode humidity sensor 60 is disposed on the fuel gas supply flow path 21 to measure the relative humidity of the fuel gas at the anode inlet. As indicated by a dashed line, the anode humidity sensor 60 is electrically connected to the controller 50 to transmit the measured relative humidity of the fuel gas to the controller 50.

The cathode humidity sensor 70 is disposed on the oxidant off-gas discharge flow path 32 to measure the relative humidity of the oxidant gas at the cathode outlet. The cathode humidity sensor 70 is electrically connected to the controller 50 to transmit the measured relative humidity of the oxidant gas to the controller 50.

The controller 50 is electrically connected to the humidity adjuster 40 to control the humidity adjuster 40 based on the detection results of the relative humidity of the fuel gas and the relative humidity of the oxidant gas.

The humidity adjuster 40 is electrically connected to the fuel gas supplier 20, the anode gas-liquid separator 23 and the oxidant gas supplier 30.

The anode gas-liquid separator 23 is disposed at the branch point of the fuel off-gas discharge flow path 22 to the circulation flow path 24. The anode gas-liquid separator 23 separates the fuel gas and the water from the fuel off-gas that is the fuel gas discharged from the anode outlet. The anode gas-liquid separator 23 recovers the water and supplies the recovered water to the fuel gas supply flow path 21 through the circulation flow path 24.

By controlling the fuel gas supplier 20, the humidity adjuster 40 controls at least one selected from the group consisting of the flow rate and pressure of the fuel gas supplied to the anode of the fuel cell 10. The opening and closing of the outlet valve of the anode gas-liquid separator 23 and the opening degree thereof are controlled by the humidity adjuster 40. The amount of water returned to the fuel gas supply flow path 21 through the circulation flow path 24 is controlled thereby. By these controls, the relative humidity of the fuel gas at the anode inlet of the fuel cell 10 is adjusted.

By controlling the oxidant gas supplier 30, the humidity adjuster 40 controls at least one selected from the group consisting of the flow rate and pressure of the oxidant gas supplied to the cathode of the fuel cell 10. The relative humidity of the oxidant gas at the cathode outlet of the fuel cell 10 is adjusted thereby.

Accordingly, the controller 50 controls the relative humidity of the fuel gas at the anode inlet to be higher than the relative humidity of the oxidant gas at the cathode outlet.

Figure 2:
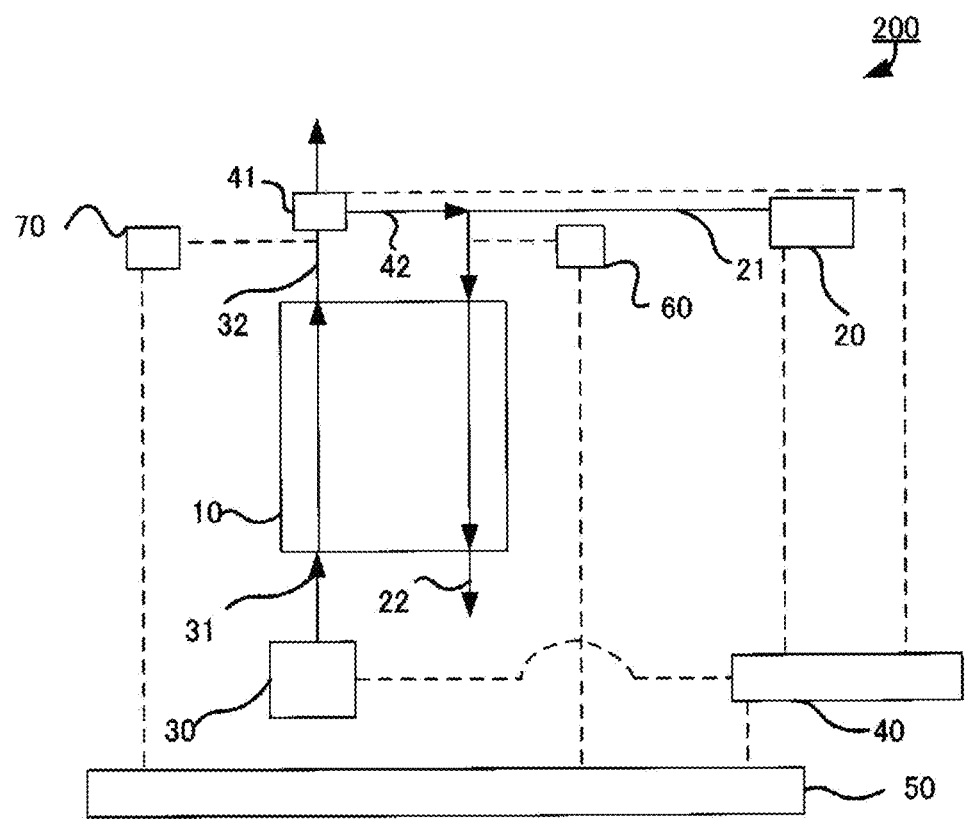
FIG. 2 is a schematic configuration diagram of another example of the fuel cell system according to the disclosed embodiments.

FIG. 2 is a schematic configuration diagram of another example of the fuel cell system according to the disclosed embodiments.

A fuel cell system 200 shown in FIG. 2 includes the fuel cell 10, the fuel gas supplier 20, the fuel gas supply flow path 21, the fuel off-gas discharge flow path 22, the oxidant gas supplier 30, the oxidant gas supply flow path 31, the oxidant off-gas discharge flow path 32, the humidity adjuster 40, a cathode gas-liquid separator 41, a bypass flow path 42, the controller 50, the anode humidity sensor 60 and the cathode humidity sensor 70. The same components as those shown in FIG. 1 will not be described here.

The cathode gas-liquid separator 41 is disposed on the oxidant off-gas discharge flow path 32. The cathode gas-liquid separator 41 separates the oxidant gas and the generated water from the oxidant off-gas that is the oxidant gas discharged from the cathode outlet. The cathode gas-liquid separator 41 recovers the generated water and supplies the recovered generated water to the fuel gas supply flow path 21 through the bypass flow path 42.

The cathode gas-liquid separator 41 is electrically connected to the humidity adjuster 40. The opening and closing of the outlet valve of the cathode gas-liquid separator 41 and the opening degree thereof are controlled by the humidity adjuster 40. The amount of generated water supplied to the fuel gas supply flow path 21 through the bypass flow path 42 is controlled thereby. Accordingly, the controller 50 adjusts the relative humidity of the fuel gas at the anode inlet of the fuel cell 10. The method for adjusting the relative humidity of the oxidant gas is the same as the case of FIG. 1.

Figure 3:
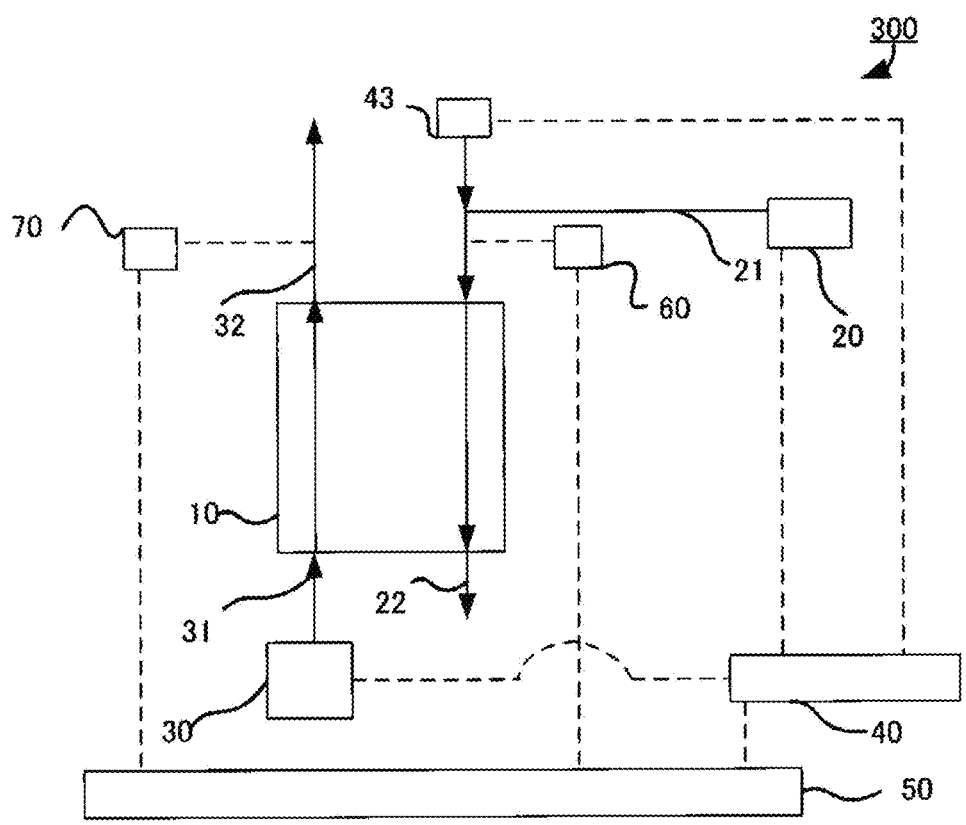
FIG. 3 is a schematic configuration diagram of another example of the fuel cell system according to the disclosed embodiments.

FIG. 3 is a schematic configuration diagram of another example of the fuel cell system according to the disclosed embodiments.

A fuel cell system 300 shown in FIG. 3 includes the fuel cell 10, the fuel gas supplier 20, the fuel gas supply flow path 21, the fuel off-gas discharge flow path 22, the oxidant gas supplier 30, the oxidant gas supply flow path 31, the oxidant off-gas discharge flow path 32, the humidity adjuster 40, a water tank 43, the controller 50, the anode humidity sensor 60 and the cathode humidity sensor 70. The same components as those shown in FIG. 1 will not be described here.

The water tank 43 supplies water to the fuel gas supply flow path 21. The water tank 43 is electrically connected to the humidity adjuster 40. The amount of water supplied to the fuel gas supply flow path 21 is controlled by controlling the water tank 43 by the humidity adjuster 40. Accordingly, the controller 50 adjusts the relative humidity of the fuel gas at the anode inlet of the fuel cell 10. The method for adjusting the relative humidity of the oxidant gas is the same as the case of FIG. 1.

Figure 4:
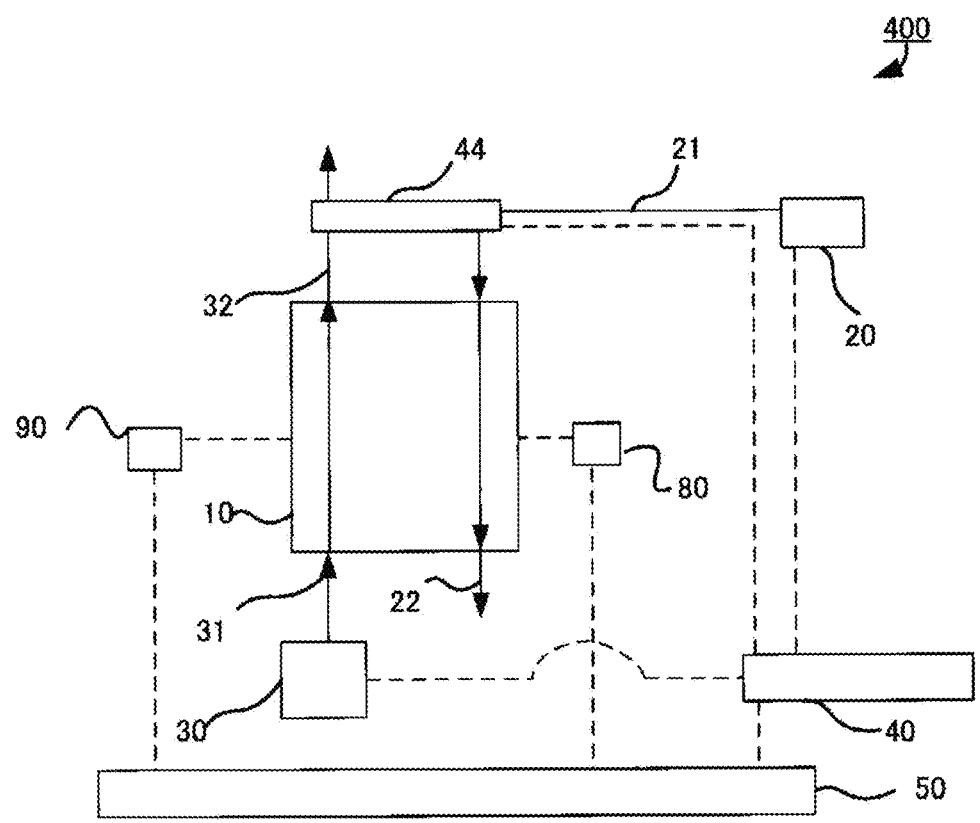
FIG. 4 is a schematic configuration diagram of another example of the fuel cell system according to the disclosed embodiments.

FIG. 4 is a schematic configuration diagram of another example of the fuel cell system according to the disclosed embodiments.

A fuel cell system 400 shown in FIG. 4 includes the fuel cell 10, the fuel gas supplier 20, the fuel gas supply flow path 21, the fuel off-gas discharge flow path 22, the oxidant gas supplier 30, the oxidant gas supply flow path 31, the oxidant off-gas discharge flow path 32, the humidity adjuster 40, a humidity exchanger 44, the controller 50, a temperature sensor 80 and a current sensor 90. The same components as those in FIG. 1 will not be described here.

The temperature sensor 80 measures the temperature of the fuel cell. The temperature sensor 80 is electrically connected to the controller 50 to transmit the measured fuel cell temperature to the controller 50.

The current sensor 90 measures the current flowing in the fuel cell. The current sensor 90 is electrically connected to the controller 50 to transmit the measured current flowing in the fuel cell to the controller 50.

The humidity adjuster 40 is electrically connected to the controller 50 to transmit the flow rate and pressure of the fuel gas supplied to the anode and the flow rate and pressure of the oxidant gas supplied to the cathode to the controller 50.

The controller 50 detects the current flowing in the fuel cell, the temperature of the fuel cell, the flow rate and pressure of the fuel gas supplied to the anode, and the flow rate and pressure of the oxidant gas supplied to the cathode.

From the current flowing in the fuel cell, the temperature of the fuel cell, the flow rate and pressure of the fuel gas supplied to the anode, and the flow rate and pressure of the oxidant gas supplied to the cathode, the controller 50 calculates the generated power distribution and humidity distribution in the whole surface of the anode and the generated power distribution and humidity distribution in the whole surface of the cathode.

From the generated power distribution and humidity distribution calculation results, the controller 50 estimates the relative humidity of the oxidant gas in the whole surface of the cathode and the relative humidity of the fuel gas in the whole surface of the anode. The relative humidity of the oxidant gas in the whole surface of the cathode may be deemed as the relative humidity of the oxidant gas at the cathode outlet. The relative humidity of the fuel gas in the whole surface of the anode may be deemed as the relative humidity of the fuel gas at the anode inlet.

Based on the estimation results, using the humidity adjuster 40, the controller 50 controls at least one selected from the group consisting of the flow rate and pressure of the fuel gas supplied to the anode and at least one selected from the group consisting of the flow rate and pressure of the oxidant gas supplied to the cathode.

The humidity exchanger 44 is disposed on the oxidant off-gas discharge flow path 32 and on the fuel gas supply flow path 21. The humidity exchanger 44 recovers the generated water contained in the oxidant off-gas flowing through the oxidant off-gas discharge flow path 32, and it supplies the recovered generated water to the fuel gas supply flow path 21. The humidity exchanger 44 is electrically connected to the humidity adjuster 40. The amount of the generated water supplied to the fuel gas supply flow path 21 is controlled by controlling the humidity exchanger 44 by the humidity adjuster 40. Accordingly, the controller 50 adjusts the relative humidity of the fuel gas at the anode inlet of the fuel cell 10.

By these controls, the controller 50 controls the relative humidity of the fuel gas in the whole surface of the anode to be higher than the relative humidity of the oxidant gas in the whole surface of the cathode. Accordingly, the controller 50 controls the relative humidity of the fuel gas at the anode inlet to be higher than the relative humidity of the oxidant gas at the cathode outlet.

EXAMPLES

Hereinafter, for the case where the relative humidity of the fuel gas in the anode is higher than the relative humidity of the oxidant gas in the cathode, the effects will be described.

Reference Example 1

A predetermined fuel cell was prepared. The power generation of the fuel cell was carried out in the condition that the relative humidity of the fuel gas supplied to the anode was fixed at 30% and the relative humidity of the oxidant gas supplied to the cathode was 0%, 5%, 10%, 20% and 30%, thereby measuring the open circuit potential (OCP) of the cathode (electrode C) against the anode (electrode A). The open circuit potential is the potential of the cathode or anode when no load is connected. The fuel gas used in Reference Example 1 was hydrogen, and the oxidant gas was air.

Figure 5:
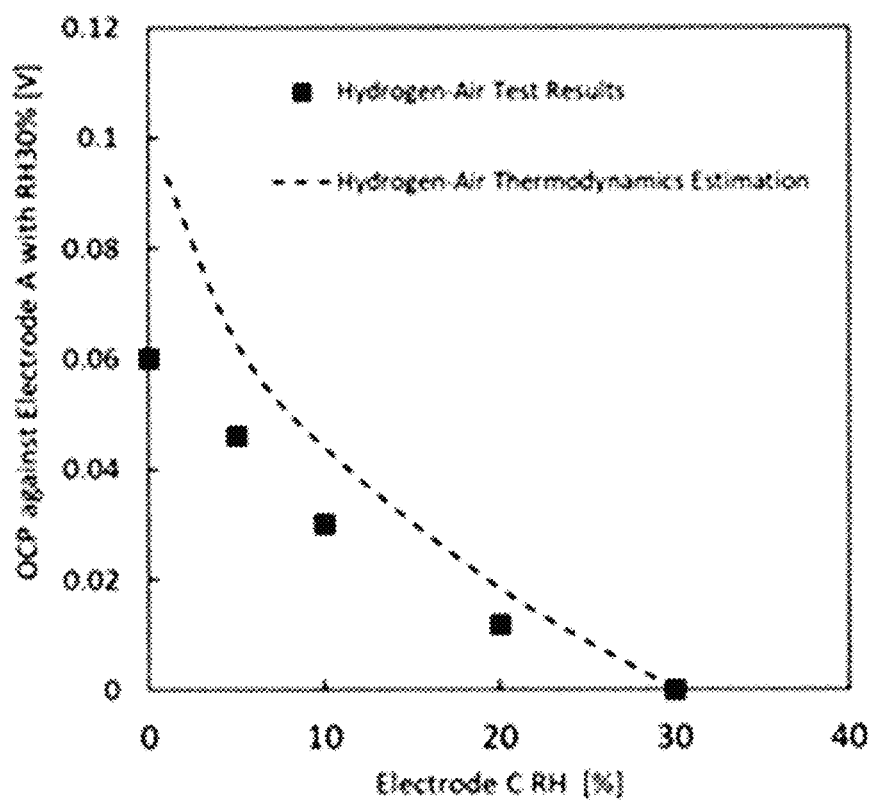
FIG. 5 is a view showing the relationship between the relative humidity of the oxidant gas supplied to the cathode (electrode C) and the open circuit potential (OCP) of the cathode when the power generation of the fuel cell was carried out in the condition that the relative humidity of the fuel gas supplied to the anode (electrode A) was fixed at 30% and the relative humidity of the oxidant gas supplied to the cathode (electrode C) was changed from 0% to 30%.

FIG. 5 is a view showing the relationship between the relative humidity of the oxidant gas supplied to the cathode (electrode C) and the open circuit potential (OCP) of the cathode when the power generation of the fuel cell was carried out in the condition that the relative humidity of the fuel gas supplied to the anode (electrode A) was fixed at 30% and the relative humidity of the oxidant gas supplied to the cathode (electrode C) was changed from 0% to 30%. In FIG. 5, a dotted curve is a theoretical curve derived from the Gibbs-Duhem relation, and measured values are plotted as squares. As indicated by the theoretical curve, it was revealed that when there is a difference in relative humidity between the anode and the cathode, the open circuit potential of the cathode against the anode is increased.

As a result of the experiment, with reference to the case where the relative humidity of the fuel gas in the anode was 30% and the relative humidity of the oxidant gas in the cathode was 30%, an OCP increase of up to 60 mV was observed. Accordingly, it was revealed that the experimental result can be theoretically analyzed.

Reference Example 2

A predetermined fuel cell was prepared. The power generation of the fuel cell was carried out in the condition that the relative humidity of the fuel gas supplied to the anode was fixed at 100% and the relative humidity of the oxidant gas supplied to the cathode was 40%, 50% and 60%, thereby measuring the open circuit voltage (OCV) of the fuel cell. The open circuit voltage is the voltage of the fuel cell when no load is connected. The fuel gas used in Reference Example 2 was hydrogen, and the oxidant gas was air.

Figure 6:
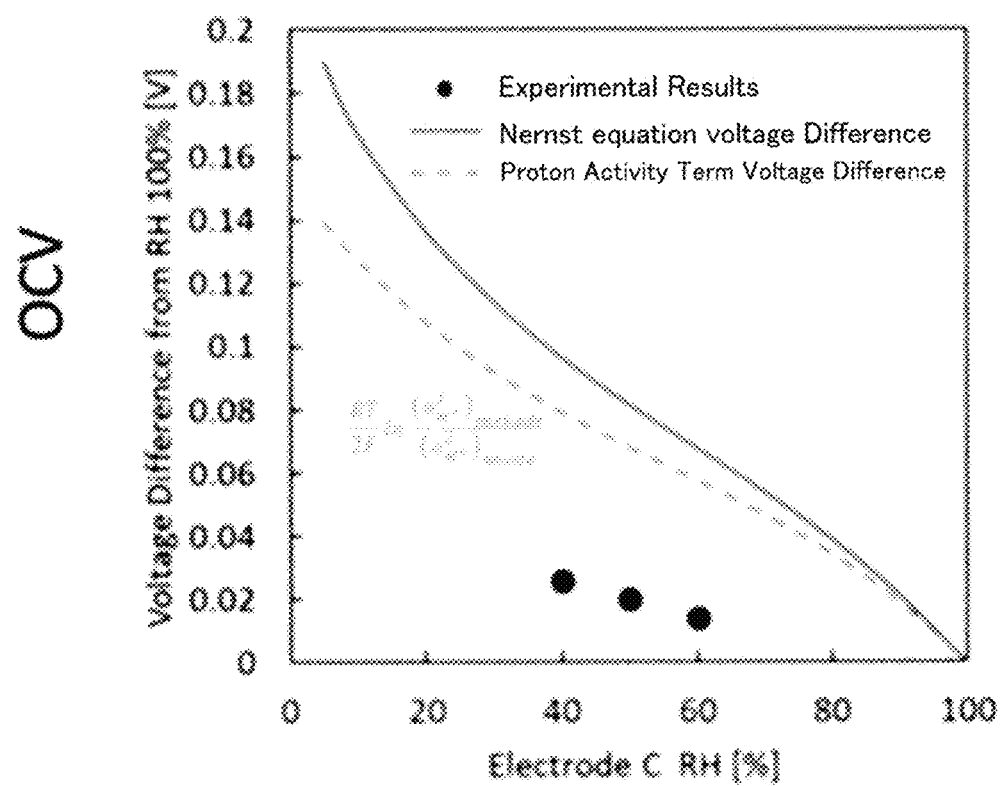
FIG. 6 is a view showing the relationship between the relative humidity of the oxidant gas supplied to the cathode and the open circuit voltage (OCV) of the fuel cell when the relative humidity of the fuel gas supplied to the anode was fixed at 100% and the relative humidity of the oxidant gas supplied to the cathode (electrode C) was changed.

FIG. 6 is a view showing the relationship between the relative humidity of the oxidant gas supplied to the cathode and the open circuit voltage (OCV) of the fuel cell when the relative humidity of the fuel gas supplied to the anode was fixed at 100% and the relative humidity of the oxidant gas supplied to the cathode (electrode C) was changed. In FIG. 6, a solid curve is a theoretical curve obtained by using the Nernst equation. Also in FIG. 6, a dotted curve is a theoretical curve in terms of proton activity. Also in FIG. 6, measured values are plotted as circles. The solid theoretical curve shows that with reference to the case where the relative humidity of the fuel gas in the anode was 100% and the relative humidity of the oxidant gas in the cathode was 100%, the OCV is increased by fixing the relative humidity of the fuel gas in the anode at 100% and decreasing the relative humidity of the oxidant gas in the cathode. It was revealed that by fixing the relative humidity of the fuel gas in the anode at 100% and changing the relative humidity of the oxidant gas in the cathode, an OCV increase of 50 mV or more is expected in the region where the relative humidity of the oxidant gas in the cathode is 60% or less. From the dotted theoretical curve, it is theoretically revealed that this effect is mainly the effect of proton activity.

As a result of the experiment, with reference to the case where the relative humidity of the fuel gas in the anode was 100% and the relative humidity of the oxidant gas in the cathode was 100%, an OCV increase was observed in the region where the relative humidity of the oxidant gas in the cathode was 60% or less. Accordingly, it was revealed that the experimental result can be theoretically analyzed.

Figure 7:
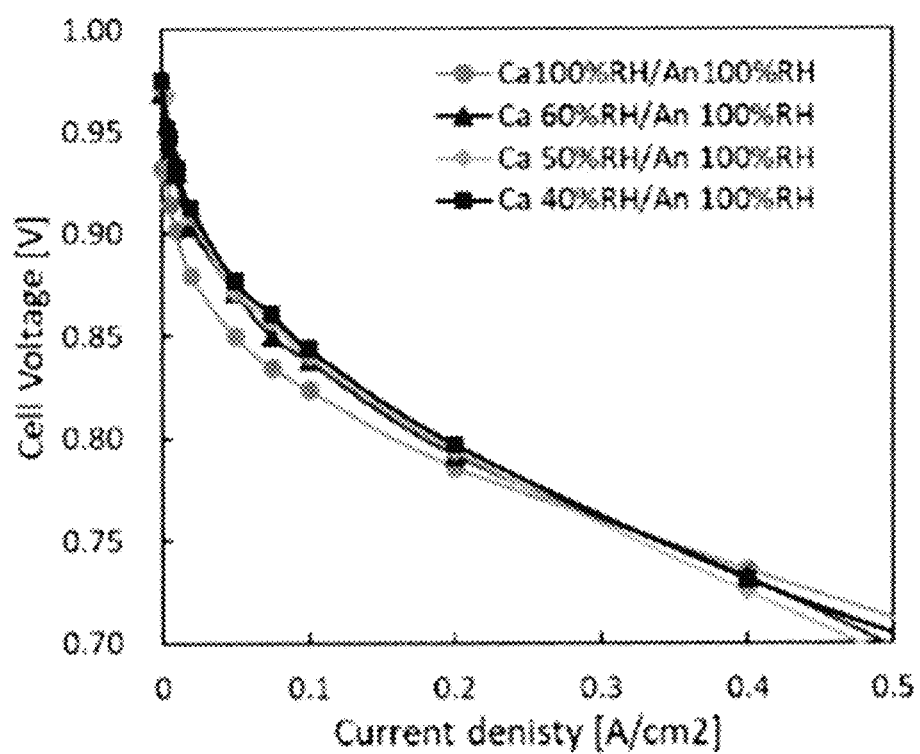
FIG. 7 is a view showing the current density-voltage curves of the fuel cell when the power generation of the fuel cell was carried out in the condition that the relative humidity of the fuel gas in the anode was fixed at 100% and the relative humidity of the oxidant gas in the cathode was 40%, 50%, 60% and 100%.

FIG. 7 is a view showing the current density-voltage curves of the fuel cell when the power generation of the fuel cell was carried out in the condition that the relative humidity of the fuel gas in the anode was fixed at 100% and the relative humidity of the oxidant gas in the cathode was 40%, 50%, 60% and 100%.

Figure 8:
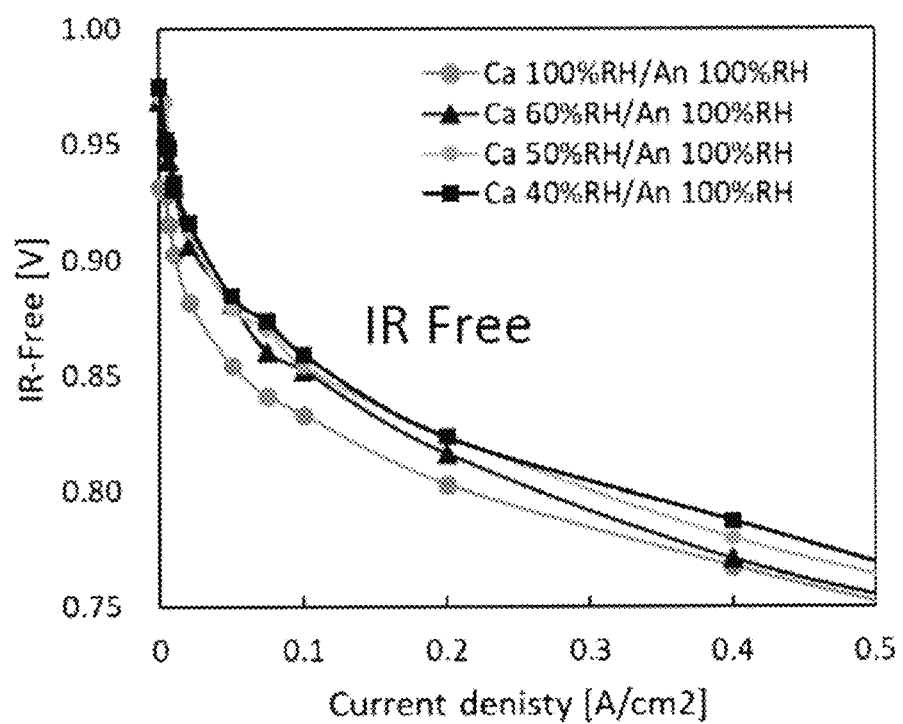
FIG. 8 is a view showing the current density-IR-Free curves of the fuel cell when the power generation of the fuel cell was carried out in the condition that the relative humidity of the fuel gas in the anode was fixed at 100% and the relative humidity of the oxidant gas in the cathode was 40%, 50%, 60% and 100%.

FIG. 8 is a view showing the current density-IR-Free curves of the fuel cell when the power generation of the fuel cell was carried out in the condition that the relative humidity of the fuel gas in the anode was fixed at 100% and the relative humidity of the oxidant gas in the cathode was 40%, 50%, 60% and 100%. IR-Free measurement is carried out to obtain the net voltage Vo of the fuel cell, which is obtained by adding an ohmic voltage drop IR, which is due to the internal resistance R of the fuel cell system, to the voltage V of the fuel cell at the moment of outputting a given current I.

In FIGS. 7 and 8, "Ca" means cathode, and "An" means anode.

From FIGS. 7 and 8, it is revealed that the IR-Free in the low current region (0.5 A/cm$^2$ or less) indicates an increase in IV performance compared to the case where the relative humidity of the fuel gas in the anode was 100% and the relative humidity of the oxidant gas in the cathode was 100%. In this low current region, the voltage is high in the case where the relative humidity was 40%, 50% and 60%, compared to the case where the relative humidity was 100%.

From the above results, it was theoretically and experimentally demonstrated that the voltage of the fuel cell is increased by making the relative humidity of the fuel gas in the anode larger than the relative humidity of the oxidant gas in the cathode. Accordingly, high power output is obtained from the fuel cell by performing control so that the relative humidity of the fuel gas at the anode inlet is higher than the relative humidity of the oxidant gas at the cathode outlet. Especially when the relative humidity of the fuel gas at the anode inlet is 100% and the relative humidity of the oxidant gas at the cathode outlet is 60%, a balance is maintained between an increase in the resistance of the fuel cell, which is due to drying of the electrolyte membrane, and an increase in the voltage of the fuel cell, which is due to a difference in relative humidity between the fuel gas and the oxidant gas.

REFERENCE SIGNS LIST

10. Fuel cell
20. Fuel gas supplier
21. Fuel gas supply flow path
22. Fuel off-gas discharge flow path
23. Anode gas-liquid separator
24. Circulation flow path
30. Oxidant gas supplier
31. Oxidant gas supply flow path
32. Oxidant off-gas discharge flow path
40. Humidity adjuster
41. Cathode gas-liquid separator
42. Bypass flow path
43. Water tank
44. Humidity exchanger
50. Controller
60. Anode humidity sensor
70. Cathode humidity sensor
80. Temperature sensor
90. Current sensor
100. Fuel cell system
200. Fuel cell system
300. Fuel cell system
400. Fuel cell system

The invention claimed is:

1. A fuel cell system comprising:
   a fuel cell,
   a fuel gas supplier configured to supply fuel gas to an anode of the fuel cell,
   an oxidant gas supplier configured to supply oxidant gas to a cathode of the fuel cell,
   an anode humidity sensor disposed at a fuel gas supply flow path;
   a cathode humidity sensor disposed at an oxidant off-gas discharge flow path;
   a humidity adjuster configured to adjust a relative humidity of the fuel gas and a relative humidity of the oxidant gas, and
   a controller,
   wherein the controller configured to detect the relative humidity of the fuel gas at an anode inlet of the fuel cell from the anode humidity sensor, and the controller detects the relative humidity of the oxidant gas at a cathode outlet of the fuel cell from the cathode humidity sensor, and
   wherein, based on detection results, the controller controls the humidity adjuster so that the relative humidity of the fuel gas at the anode inlet is higher than the relative humidity of the oxidant gas at the cathode outlet;
   wherein the humidity adjuster comprises a valve connected to a water supply, and wherein the humidity adjuster controls humidity by controlling an opening degree of the valve.

2. The fuel cell system according to claim 1, wherein the relative humidity of the fuel gas at the anode inlet is 100% or more, and the relative humidity of the oxidant gas at the cathode outlet is 60% or less.

3. The fuel cell system according to claim 1, wherein the relative humidity of the fuel gas at the anode inlet is 30% or more, and the relative humidity of the oxidant gas at the cathode outlet is 0% or more and less than 30%.

* * * * *